United States Patent
Astala et al.

(10) Patent No.: US 6,590,568 B1
(45) Date of Patent: Jul. 8, 2003

(54) TOUCH SCREEN DRAG AND DROP INPUT TECHNIQUE

(75) Inventors: Arto Astala, Vantaa (FI); Tapio Mansikkaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 200 days.

(21) Appl. No.: 09/714,939

(22) Filed: Nov. 20, 2000

(51) Int. Cl.[7] .............................. G09G 5/00; G09G 5/08
(52) U.S. Cl. ........................ 345/173; 345/156; 345/157; 178/18.01
(58) Field of Search ................................ 345/156–179, 345/799, 856–857

(56) References Cited

U.S. PATENT DOCUMENTS

| | | | | |
|---|---|---|---|---|
| 5,327,161 A | * | 7/1994 | Logan et al. ................. | 345/173 |
| 5,463,388 A | * | 10/1995 | Boie et al. ................... | 345/174 |
| 5,673,066 A | * | 9/1997 | Toda et al. .................. | 345/173 |
| 5,825,352 A | * | 10/1998 | Bisset et al. ................. | 345/173 |
| 5,880,411 A | * | 3/1999 | Gillespie et al. ......... | 178/18.01 |
| 6,430,164 B1 | * | 8/2002 | Jones et al. ................. | 370/313 |
| 6,433,801 B1 | * | 8/2002 | Moon et al. ................. | 345/777 |

* cited by examiner

Primary Examiner—Steven Saras
Assistant Examiner—Michael J Moyer
(74) Attorney, Agent, or Firm—Antonelli, Terry, Stout & Kraus, LLP

(57) ABSTRACT

A method of and apparatus for dragging and dropping items displayed on a touch screen. In one embodiment, the item on the touch screen is touched with a pressure greater than a first predetermined pressure for a first predetermined period of time. The pressure on the item is then reduced, and the item is dragged with the reduced pressure to a second location at which the touch screen is touched with a pressure greater than a second predetermined pressure for a time duration greater than a second predetermined time period. In another embodiment, the item on the touch screen is touched with a pressure greater than a predetermined pressure for a first predetermined period of time, and then the touch screen is touched at a second location with a pressure greater than the predetermined pressure for a second predetermined period of time, less than the first predetermined period of time.

24 Claims, 7 Drawing Sheets

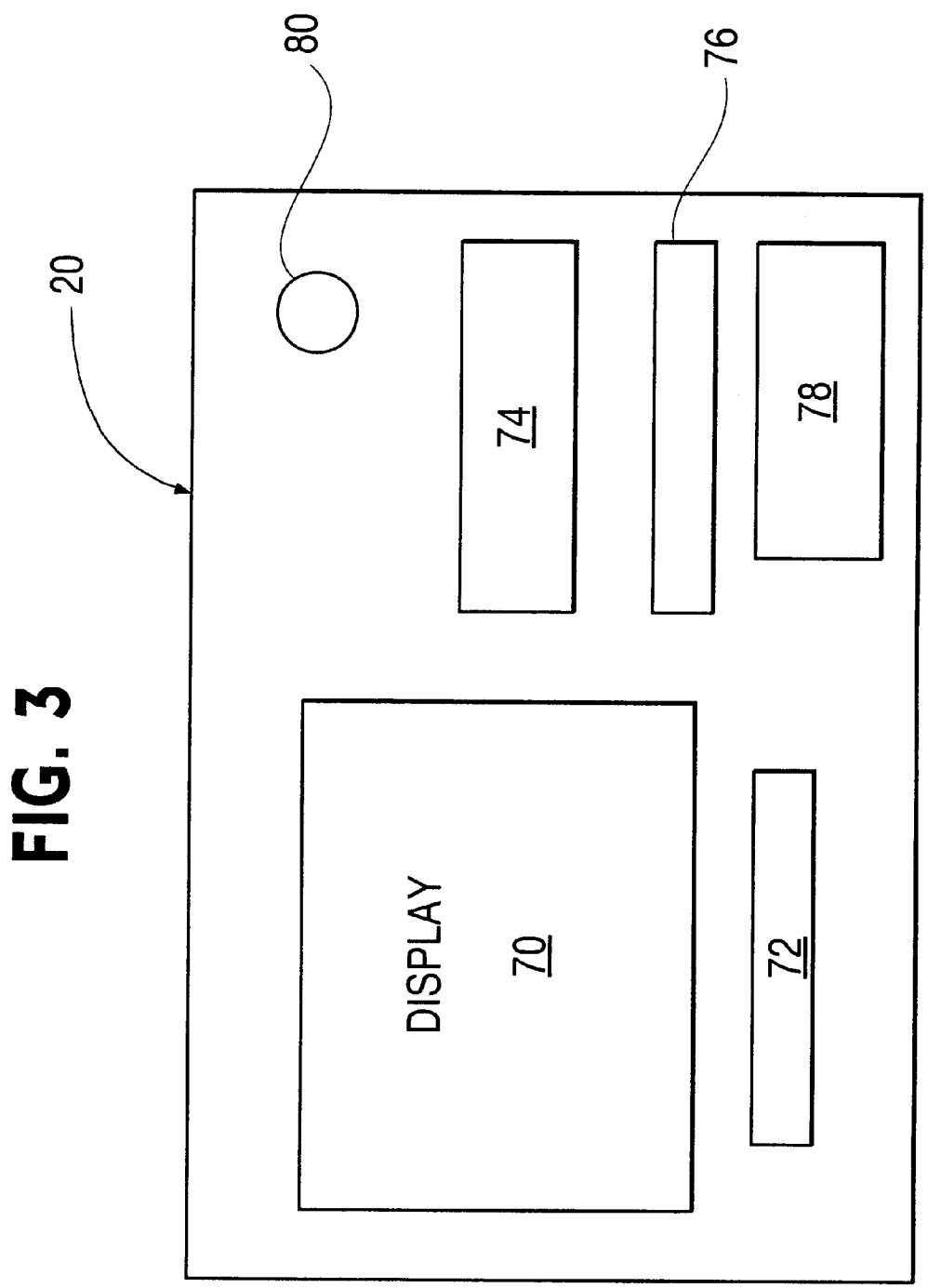

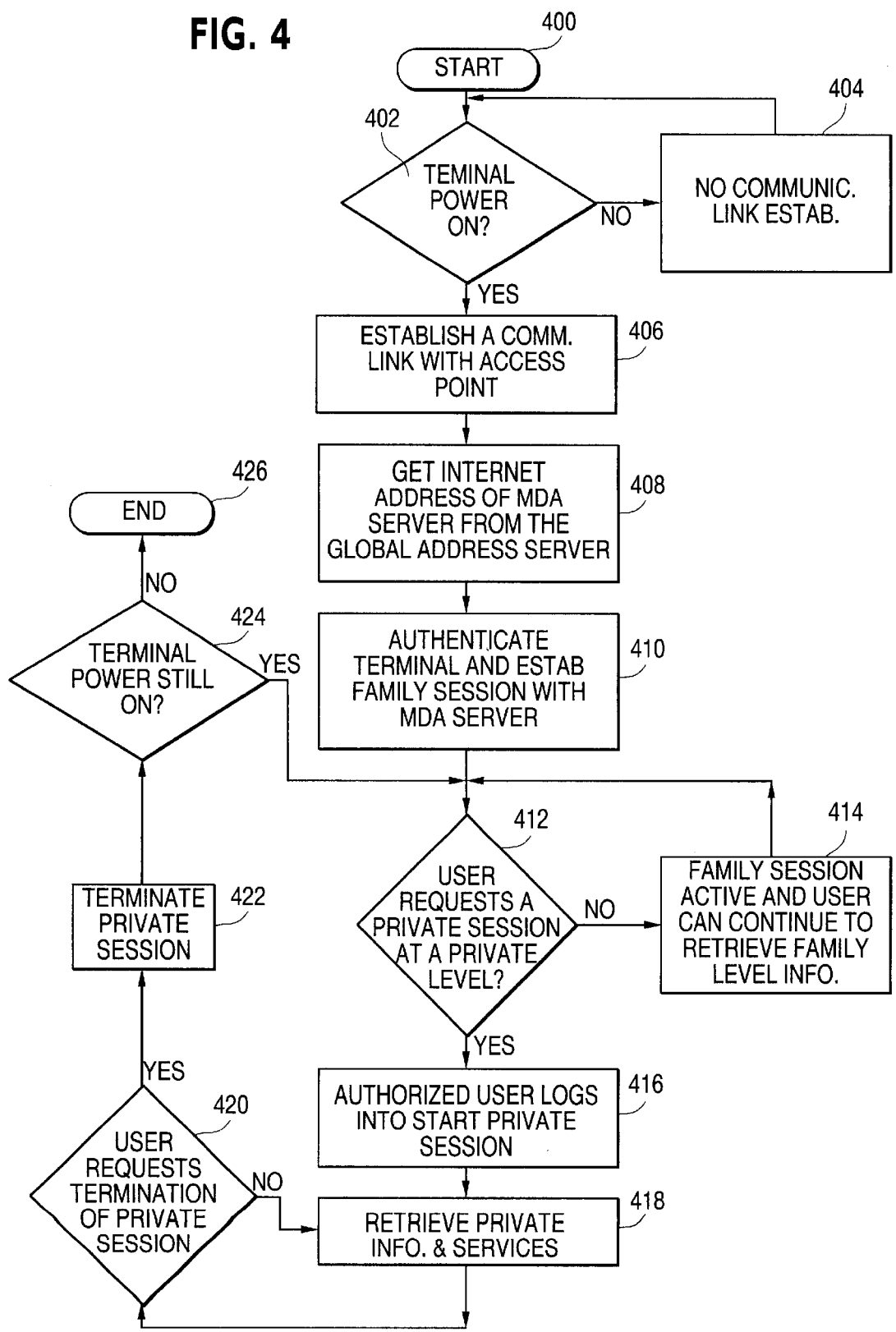

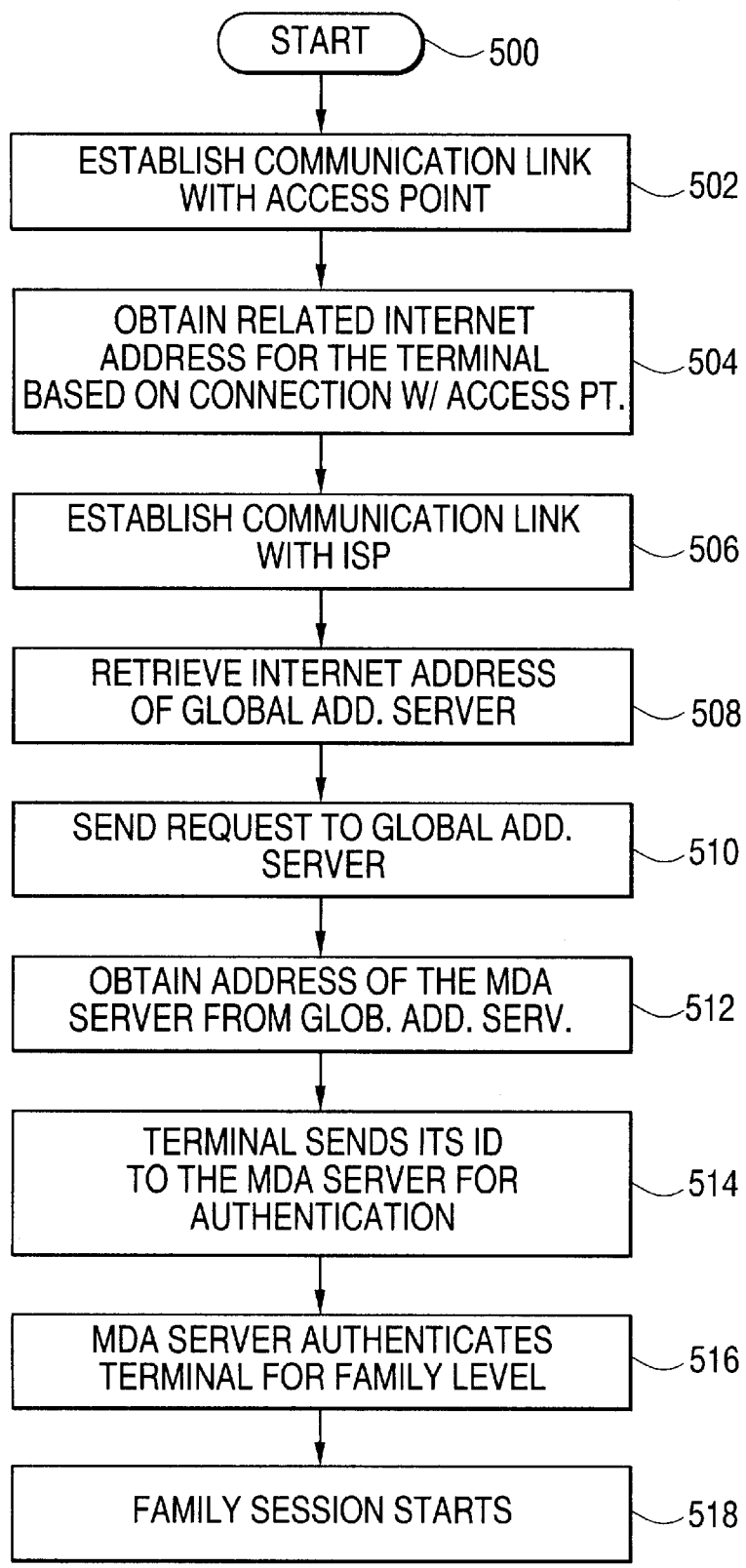

TOUCH SCREEN DRAG AND DROP INPUT TECHNIQUE

CROSS-REFERENCE TO RELATED APPLICATIONS

The present application is related to U.S. application Ser. No. 09/609,581, filed in the U.S. Patent and Trademark Office on Jun. 20, 2000; U.S. application Ser. Nos. 09/607,637 and 09/607,638, both filed in the U.S. Patent and Trademark Office on Jun. 30, 2000; and U.S. application Ser. No. 09/659,416, filed in the U.S. Patent and Trademark Office on Sep. 11, 2000, the content of these applications being incorporated by reference herein in their entirety. Furthermore, priority is claimed under 35 U.S.C. '120 for the aforecited U.S. application Ser. No. 09/607,638.

BACKGROUND OF THE INVENTION

The present invention relates to electronic devices and more particularly to a touch screen input technique for allowing a user input to an electronic device having a touch screen.

Advances in technology have resulted in smaller and more sophisticated electronic devices becoming available. These devices, such as portable communication devices, allow a user wireless access to communication networks, thereby enabling both Internet access and two-way e-mail communication.

As the size of these communication devices decreases and as the number of functions increases, it has become increasingly important for a user to be able to enter commands and information into the communication device in an efficient manner. With a reduction in size of the device, a keypad input device must also be reduced in size, thereby decreasing the efficiency with which information can be inputted by reducing the number and size of the keys. Furthermore, with a reduction in size of the device, the display size must also be reduced. Still furthermore, the use of a mouse with such devices is usually not possible since a mouse requires a flat clean surface to be properly used.

The use of a touch screen input device that serves both as a display and as an input device for the communication device allows a larger display in that a large keypad is no longer required since many of the functions have been taken over by the use of the display screen as an input device. A user enters information and data by touching the display screen at specific points.

U.S. Pat. No. 4,700,022 to Salvador et al. is directed to a method an apparatus for determining the coordinates of a contact point on a resistive type semi-analog sensitive surface. The coordinates are of a zone of contact of a conductive object, such as a finger, on a sensitive surface consisting of an insulating support having a grate formed by two terminals between which a certain number of emitting resistant strips are connected in parallel and having detecting conductive strips placed between the resistant strips. This patent merely discloses one of many techniques for determining the location of the zone of contact on a touch sensitive screen.

U.S. Pat. No. 5,119,079 to Hube et al. is directed to a touch screen user interface with expanding touch locations for a reprographic machine. The interface allows the expansion of the area for selection on the touch screen so as to improve the accuracy of selection thereof.

U.S. Pat. No. 5,545,857 to Lee et al. is directed to a remote control device having a touch screen allowing user input via the touch screen.

While each of the three above-noted patents discloses the use of a touch screen for inputting purposes, none of these patents teaches or suggests a touch screen arrangement in which both the location and the time duration and/or pressure and/or velocity of a finger or other object contacting the touch screen are detected, the detected values being quantized so as to allow the dragging and dropping of an item displayed on the touch screen.

SUMMARY OF THE INVENTION

An object of the present invention is to provide a touch screen technique for an electronic device, for example, which allows such electronic device to have a reasonably large display screen in a compact configuration. The keypad of the device or substantial portions of the keypad of the device are deleted and their functions implemented by the touch screen display screen, thereby allowing more space to be utilized for the display screen.

Another object of the present invention is to provide a touch screen technique for an electronic device in which the location and the time duration of an object, such as a finger or stylus or other pointed object, contacting or pressing a detection point on the touch screen, are detected. In addition, the pressure of the object on the touch screen may be detected as well as the velocity of the object as it is moved across the face of the touch screen. The detected time duration may be quantized into one of two or more values, each value corresponding to a specific input state. The interpretation of the contact detection may be dependent on the application and/or program phase active in the electronic device. For example, pressing a selection point for a first predetermined time period may correspond to single clicking the left button on a mouse. On the other hand, pressing a selection point for a second predetermined period of time which is longer than the first predetermined period of time may correspond to double-clicking the left button on a mouse. Thus, when a touch input is effected by pressing a selected first item displayed on the touch screen for a predetermined period of time and then dragging the object or finger along the face of the touch screen to a second item displayed on the touch screen while pressing the screen with a lighter pressure than the initial pressing on the selected first item and then pressing on the second item displayed on the touch screen for a third predetermined period of time may result in moving the selected item to the location of the second item, that is, dragging and dropping the selected first item on the second item.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein:

FIG. 3 is a block diagram of an example of a mobile terminal that may operate with the MDA system of FIG. 1;

FIG. 4 is a flowchart of a process for establishing a family session and a private session between the mobile terminal of FIG. 3 and the MDA server of FIG. 1;

FIG. 5 is a flowchart of a process for establishing a communication link between the mobile terminal of FIG. 3 and the MDA server.

DETAILED DESCRIPTION

Figure 1:
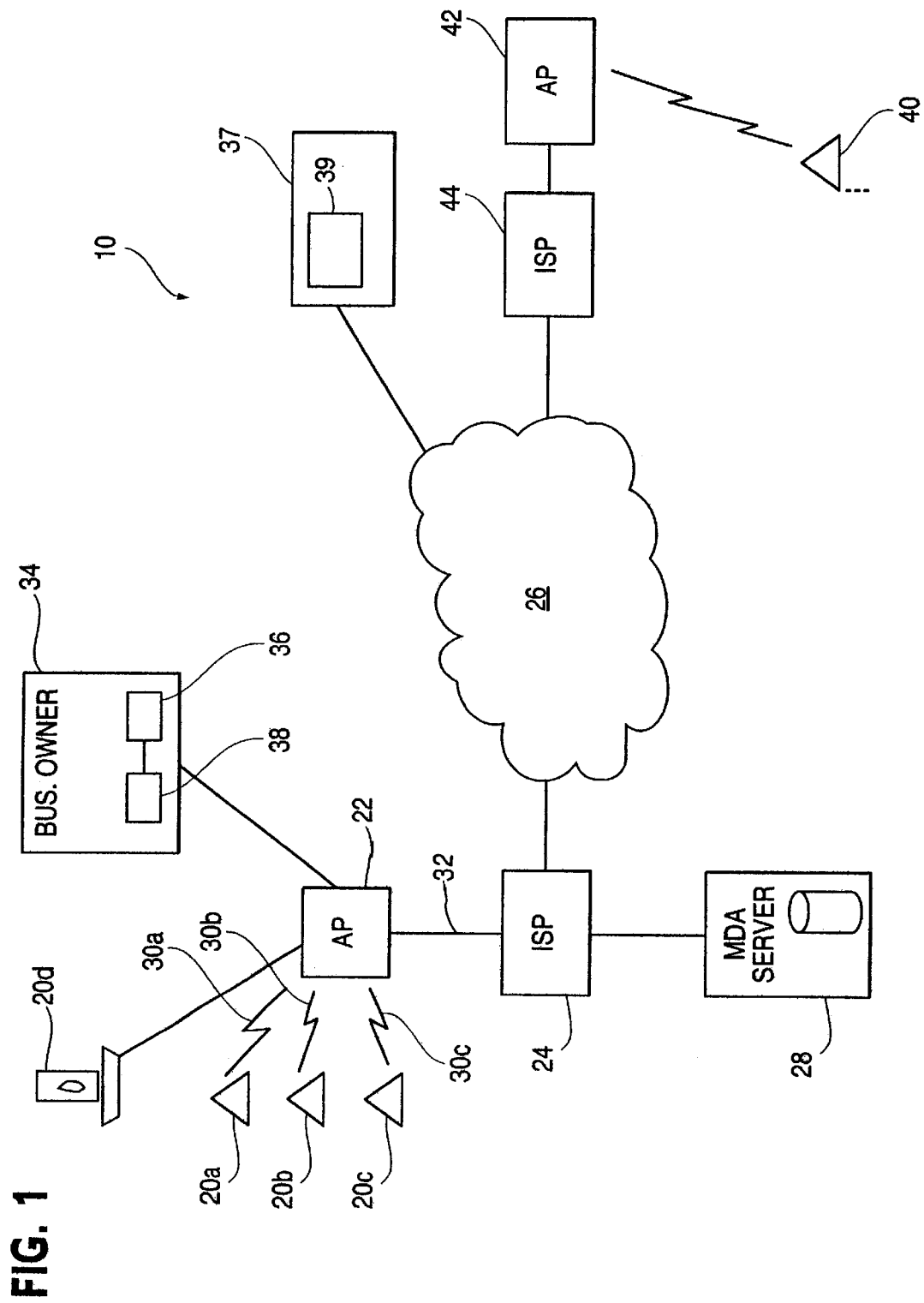
FIG. 1 is a block diagram of an example communication network having mobile terminals that are capable of communicating with a mobile display appliance (MDA) system having an MDA server with related services.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, any clock signals and timing signals that are set forth are exemplary, and critical time values are mentioned when appropriate. As a final note, well-known components have not been shown within the drawing figures for simplicity of illustration and discussion and so as not to obscure the present invention.

FIG. 1 is a block diagram of an example communication network having mobile terminals that are capable of communicating with a mobile display appliance (MDA) system having an MDA server with related services. Network 10 includes terminals 20a–20c, each coupled over a wireless interface to an access point 22, for communicating with the network and transmitting and retrieving information for a user. More specifically, the access point 22 is coupled to an Internet Service Provider (ISP) 24, which is coupled to the Internet 26. Accordingly, the access point 22 has an Internet address relative to the Internet address of the ISP 24. Additionally, the ISP 24 is coupled to a Mobile Display Appliance (MDA) server 28 that provides the users, through terminals 20a–20c, with specific services and features, which will be discussed herein.

Terminals 20a–20c each includes a user input and output device for allowing a user to access services of the MDA server 28. The MDA server 28 provides services, such as e-mail, calendar, notes, ability to shop on line, and necessary authentication, as well as third-party services and information.

Terminals 20a, 20b, and 20c are coupled to the access point 22 via wireless connections 30a, 30b, and 30c, respectively; hence, the user has portable or mobile access to the Internet 26 and the services provided by the MDA server 28. More specifically, terminals 20a–20c may be coupled to the access point 22 using a Wireless Local-Area-Network Gateway (WLAN GW) that is installed at a specific location, such as the user's premises or location. Although terminals 20a–20c are shown as being coupled to the MDA server 28 through the ISP 24, the present invention, as set forth in the claims, is not limited thereby. Furthermore, in the illustrated network of FIG. 1, the ISP 24 is not acting as the MDA server 28 and vice versa, even though this is possible. For example, terminals 20a–20c may be coupled directly to the MDA server 28 through the access point 22.

Additionally, even though the access point 22 is shown as being coupled to the ISP 24 through a landline 32, the present invention as set forth in the claims is not limited thereby. For example, the access point 22 can be wirelessly coupled to the ISP 24. Thus, the terminal 20 accesses the ISP 24 through the access point 22, and thus the user can access, navigate through, and retrieve information from the Internet 26 using the terminal 20.

In order for a terminal, such as terminals 20a–20c, to have access to the services of the MDA server 28, the MDA server 28 must authenticate and authorize each terminal's access. Although only the authentication and authorization steps relating to each terminal 20a–20c are discussed in detail, the teachings set forth herein are also applicable to other terminals. Upon proper authentication of each terminal 20a–20c, the user can access the services of the MDA server 28 at the authorized level of authentication.

There are two levels of authentication that provide access to the services and information of the MDA server: the family level and the private level. The family level is a level of authentication that occurs based on the identity of each of the terminals 20a–20c in order to initiate a family session. In order to create a family, at least one terminal is needed, but typically there are several terminals that make up a family, and each terminal has a unique identity that allows the terminal access to a family session at the family level. Thus, for example, anyone having access to terminal 20a could have access to the family level information. The family level authentication may be based on the identity of the hardware of the terminal 20a, and the authentication may automatically occur when the unit is powered on. Even though the authentication at the family level may automatically occur, the present invention, as set forth in the claims, is not limited thereby. For example, the terminal 20a could request input from the user in order to initiate the family level authentication process. Once the terminal 20a is authorized to access the services, then each user is able to access information and services that are available to all other users in the family as well as to initiate a private session to access private information and services available only to that user.

Unlike the family session at the family level, the level of authentication for a private session at the private level requires input from the user to allow the user of a terminal, such as, for example, terminal 20a, access to information intended only for that user. For example, the user could use any terminal that is within the user's family and then initiate a private session to access information and services specific to that user. The authentication can be done using anything that is unique and only known by that user, such as a password. Thus, the user can have a private session with a secured level of privacy of information and/or services unique to that user, regardless of which terminal is being used. However, as indicated above, anyone having access to the terminal 20a would have access to the family level information and services, because it is assumed for exemplary purposes that authentication is based on the hardware of the terminal 20a and occurs automatically, and a family session is always active when the terminal is on. This allows anyone, even an unauthorized user, to access the family level services and to perform tasks, and access the Internet through the ISP 24 coupled to the access point 22.

In addition to the ISP 24, the access point 22 is also coupled to a business owner 34. The business owner 34 includes a global address server 36 and a global upgrade server 38. The Internet address of the global address server 36 may be permanently contained in the memories of the terminals 20. The global address server 36 is a place from which all the terminals, such as terminals 20a, 20b, and 20c, can fetch the Internet address of their respective MDA server. The advantage of having each terminal 20a–20c store the Internet address of the global address server 36 is that if terminals 20a–20c were relocated near another access point, then terminals 20a–20c can still obtain the Internet address location of the MDA server 28 simply by knowing the Internet address of the global address server 36. However, the invention as set forth in the claims is not limited thereby. For example, the Internet address of the MDA server 28 could be stored on terminals 20a–20c, and the memories of terminals 20a–20c could be updated as needed.

The user profile and terminal-specific user interface configuration settings, as well as possible software component or program updates to server 28, are controlled and effected by a configuration tool manager 39 (in FIG. 1) of a management server 37. Configuration changes may affect server 28 and/or terminals 20a–20c, and 40.

An advantage to storing the Internet address of the global address server 36 on each terminal 20a–20c is that the association between terminal and MDA server as well as changes in the Internet address of MDA servers can be easily and efficiently appreciated without having to update the memory of each terminal. The global update server 38 updates the global address sever 36 each time there is a change in the association between the terminal and the MDA server, when there are new terminals to associate with an MDA server, or when the Internet address of a particular MDA server is changed.

With the Internet address of the global address server 36 stored in the memory of the terminal 20, the terminal 20 is able to request and retrieve the Internet address of the MDA server 28 from the global address sever 36. The global address server 36 stores information about the location of the MDA server 28 and all other MDA servers in the network and the corresponding relation between each terminal and its MDA server, Thus, the terminal 20 is always able to obtain the address of the MDA server 28, which is the MDA server designed to serve the terminal 20. For example, the terminal 40 coupled through an access point 42 to an ISP 44 can retrieve the Internet address of the MDA server 28 from the global address server 36, provided that the MDA server 28 is the MDA server designated to serve the terminal 40 and that the terminal 40 is authenticated by the MDA server 28 as an authorized user of the services.

Figure 2:
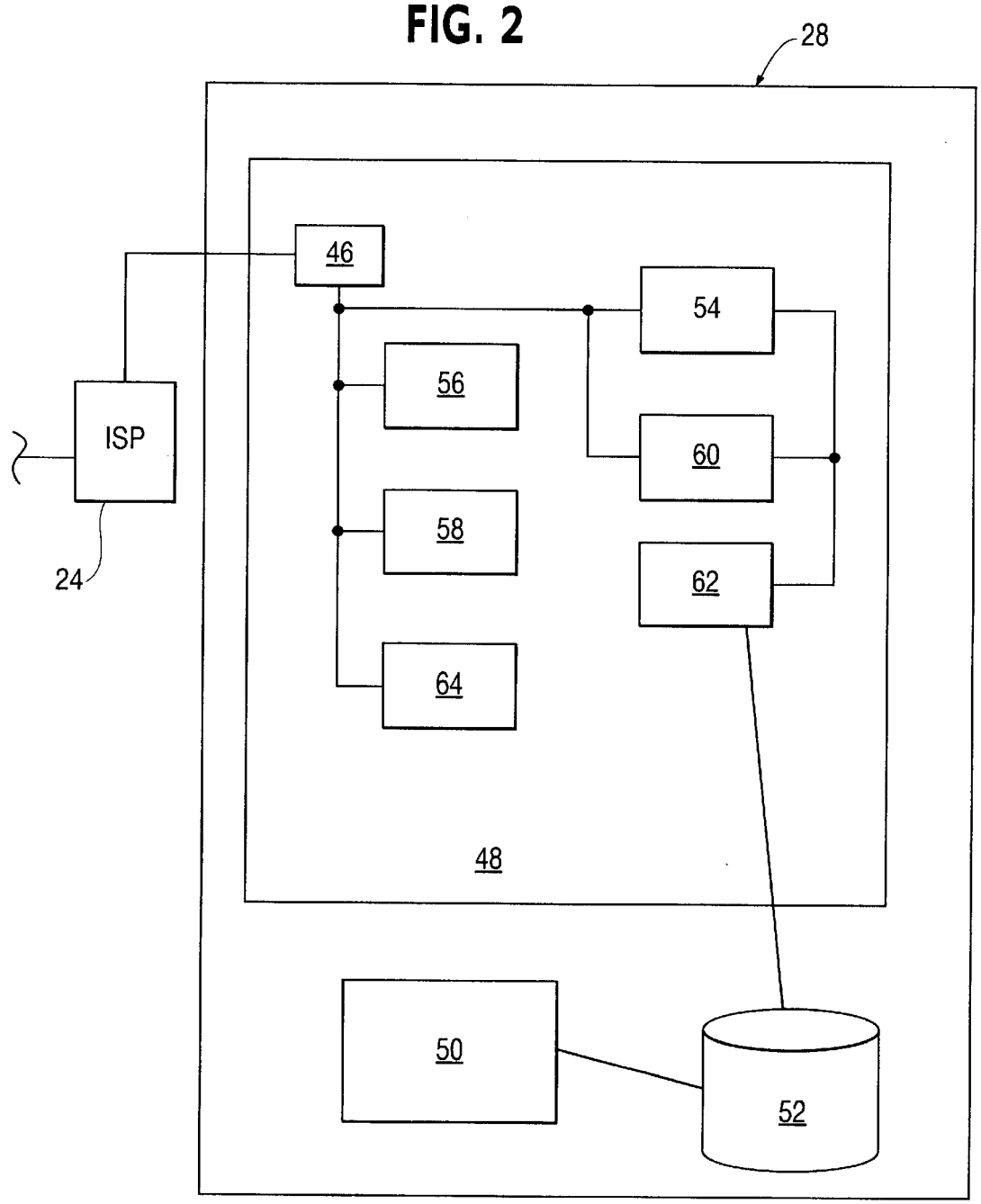
FIG. 2 is a block diagram of the MDA server of the MDA system of the network of FIG. 1.

FIG. 2 is a block diagram of the MDA server of the MDA system of the network of FIG. 1. The MDA server 38 may include an application server 46, a support server 48, a network application server 50, and a directory server 52. It will be apparent to those skilled in the art that the referenced connections do not depict the physical connections between the logical elements; the emphasis is merely on the logical connections. The support server 48 provides services oriented toward enabling and supporting the services provided to the terminal 20. The support server 48 may include an upgrade services unit 54, a login services unit 56, a profile services unit 58, an advertisement services unit 60, an administrative services unit 62, and a defined services unit 64.

The upgrade services unit 54 is a specific means for controlled software upgrade of the software for the support server 48. The login services unit 56 provides the means for authentication of the user and the terminal 20 that is being used to access the services. Additionally, the login services unit 56 is also responsible for log-off activities, such as private session termination. The profile services unit 58 provides a means for modifying a user's profile information, e.g., family and private information and preferences. The administration services unit 62 provides a means for administration of the support server 48 and the application server 46. The advertisement services unit 60 provides a means for the MDA server 28 to tailor advertisements to the user and the terminal 20 according to the user's profile information. The defined services unit 64 is a classification of other services containing items like bookmark management services, help services, log services, name management services, and general management services.

The administration services unit 62 provides for administration of the support server 46 and the application server 48. The software product updates are transmitted from the global upgrade server 38 (as shown in FIG. 1) and its configuration tool manager 39 to the upgrade service unit 54 in FIG. 2 and its configuration tool client. The configuration tool client is a functional unit that acts when any configuration tool manager 39 (as shown in FIG. 1) of the management server 37 (as shown in FIG. 1) upgrades any software component, fully executable software program, or reconfigures configuration parameters; application and system parameters, as well as user interface-specific parameters of the terminal.

FIG. 3 is a block diagram of a mobile terminal 20a that operates within the MDA system of FIG. 1. Terminals 20b and 20c may be similar in design. Terminal 20a may include a touch screen 70 for providing a display, a keyboard 72, a browser 74, a driver 76, and hardware 78. The hardware 78 may include a memory for storing data, such as the Internet address of the global address server 36, and the software for operating the terminal 20, such as the browser 74. Hardware 78 may include a touch screen controller for controlling the input process for touch screen 70. As the terminal 20a is turned on, the driver 76 retrieves data relating to the Internet address of the global address server 36. Once the terminal 20a is turned on, it is coupled to the access point 22 and the ISP 24. Thus, the terminal 20a is able to obtain its own Internet address. Using the Internet address of its global address server, the terminal 20a is coupled to the global address server 36 and sends a request in order to obtain the Internet address of its MDA server. Once the terminal 20a has the Internet address of its MDA server, it is then coupled to the MDA server 28. The MDA server 28 authenticates, using the unique identity of the hardware 78 of the terminal 20a, that the terminal 20a has family level access privileges. Accordingly, the terminal 20a is authenticated and logged onto the MDA server 28 to begin a family session at a family level. Thus, the user can now access services or retrieve information from the MDA server 28 or access the Internet 26. In order for the user to initiate a private session and retrieve private information, the user must use the terminal 20a and provide further authentication to the MDA server 28 to gain access at the private level. It will be apparent to those skilled in the art that at either the family level or the private level, the user is able to retrieve information related to the family of users as well as browse the Internet 26 to retrieve information.

The browser 74 is a typical browser and may include such features as HyperText Transfer Protocol (HTTP), JAVA script, and cascade style sheet capability. As with typical Personal Computers (PCs), the browser 74 helps the user navigate through and retrieve information from the Internet once the user is connected to the ISP 24 through the terminal 20. The user utilizes the terminal 20a to connect to both the ISP 24 and the MDA server 28 using authentication protocol as discussed in detail herein. The terminal 20a is the primary means of access by the user to the MDA server 28 and the related services and applications. However, the user can also access the ISP 24 and the MDA server 28 using a PC 20d or non-mobile terminal using appropriate family level authentication initiated manually.

In order to retrieve information or to request services from the MDA server 28 or the Internet 26, the user might utilize the input touch screen 70. The user can provide input using a virtual keyboard displayed on the display 70, using keyboard 72, or through the touch screen input on the touch screen 70 utilizing various processes and functions according to the embodiments of the invention. Even though the virtual keyboard may be used as the user retrieves information from the Internet 26, such as a web page, the user can receive the information at the display 70 of the terminal 20 in a full screen format. Full screen format is available because the virtual keyboard disappears when the user types a Universal Resource Locator (URL) or follows a hyperlink while navigating the Internet 26. In order to return to the virtual keyboard, the user presses a button 80, and the virtual keyboard as well as the header and footer related to the services are presented again. Additionally, once the user presses the button 80, the web page, which was a full screen display prior to pressing the button 80, is reduced to a thumbnail view and positioned in the display 70, such as in the bottom left corner of the footer. Consequently, the user has a shortcut to quickly access the web page that was previously visited or to save that web page as a bookmark.

FIG. 4 illustrates an example of the process of authenticating a terminal at the family level to initiate a family session and authenticating the user at the private level to initiate a private session. The process of FIG. 4 begins at step 400. At step 402, it is determined whether the terminal is turned on. At step 404, if it is determined that the terminal is not turned on, then a communication link cannot be established through an access point to the MDA server; hence, the process returns to step 402 until the terminal is turned on. On the other hand, if the terminal is turned on, then the terminal establishes a connection to the access point, and hence to an ISP and a global address server. At step 408, the terminal obtains the Internet address of its MDA server from the global address server.

At step 410, the terminal communicates with the MDA server and is authenticated as an authorized terminal with access to information and services at the family level, and the family session begins and continues until the terminal is turned off, Once the MDA server recognizes the terminal, establishing the family session is an automatic background activity carried out by the terminal and transparent to the user, which is discussed with respect to FIG. 5. In order for the user to establish a private session and access private information and services, the user has to log in as a private user at the private level.

At step 412, it is determined whether the user is an authorized private user. At step 414, if the user is not authenticated as a private user, then the user will only be given access to a family session with the family level information and services. On the other hand, at step 416, if the user is an authorized private user, then a private session is established and the user is allowed access to the private information and services. Although the private level information and services may be the same for all users, the content will vary from user to user.

At step 418, in the private session the user retrieves information and uses the private level services provided by the MDA server. At step 420, it is determined whether the user wants to terminate the private session and return to the family level. If it is determined that the user does not want to terminate the private session, then the user continues the private session at the private level and the process returns to step 418. On the other hand, if it is determined that the user wants to terminate the private session, then at step 422, the private session is terminated and the user goes from the private level to the family level. At step 424, it is determined whether the terminal is still turned on. If the terminal is turned on, then the process returns to step 412, with the user at the family level in a family session. Otherwise, if the terminal is turned off, then the family session is also terminated, and the terminal is logged off the MDA server, and the process ends at step 426.

Thus, once the MDA server authenticates the terminal, then a family session begins at the family level; once the user is recognized as a private user, then a private session is initiated. Consequently, a private session remains in effect until the user explicitly terminates the private session, whereas a family session remains in effect until the terminal is turned off. Other features can be included, such as termination of the private session if no input is received from the user after a predetermined period of time.

FIG. 5 illustrates an example of the process of establishing a communication link to an access point, step 406 of FIG. 4, and obtaining the Internet address of an MDA server for that terminal, step 408 of FIG. 4. Initiating a family session at the family level begins at step 500. At stop 502, the terminal establishes a communication link with the access point. At step 504, the terminal obtains its Internet address from the access point based on the Internet address of the access point with which the terminal has established the communication link. At step 506, the terminal establishes a communication link with the ISP coupled to the access point. At step 508, the terminal retrieves the Internet address of the global address server from its memory. At step 510, the terminal sends a request to the global address server for the Internet address of the MDA server that is associated with the terminal. At step 512, the global address server returns the Internet address of the appropriate MDA server to the terminal. At step 514, the terminal sends its identification information to the MDA server located at the Internet address provided by the global address server in order to establish a communication link with the MDA server. At step 516, the MDA server authenticates the terminal, and a family session at the family level is established between the MDA server and the terminal. Then the family session starts in step 518.

Once a family and/or private session has been established between the MDA server and terminals 20a–20c, a user may interact with the system through the virtual keyboard displayed on display 70, the keyboard 72 or the touch screen input on the touch screen display 70 according to embodiments of the invention. The touch screen display 70 may be one of various commercially available touch screen devices. Hardware 78 includes the touch screen controller that monitors touch screen-input parameters for processing the touch inputs on the touch screen display 70, which may also be one of various commercially available touch screen controllers.

FIGS. 6a–6d illustrate an example of a process for utilizing touch screen inputs according to an embodiment of the invention. Note that the process illustrated in FIGS. 6a–6d may be used with any electronic device and is not limited to the system illustrated in FIGS. 1–5, but rather FIGS. 1–5 and the detailed descriptions thereof have been included merely to illustrate an exemplary use of the present invention.

Furthermore, while in the above-noted examples, the touch screen has been touched with a finger, it is of course understood that a stylus or any other pointed object may be used with the touch screen.

Figure 6A:
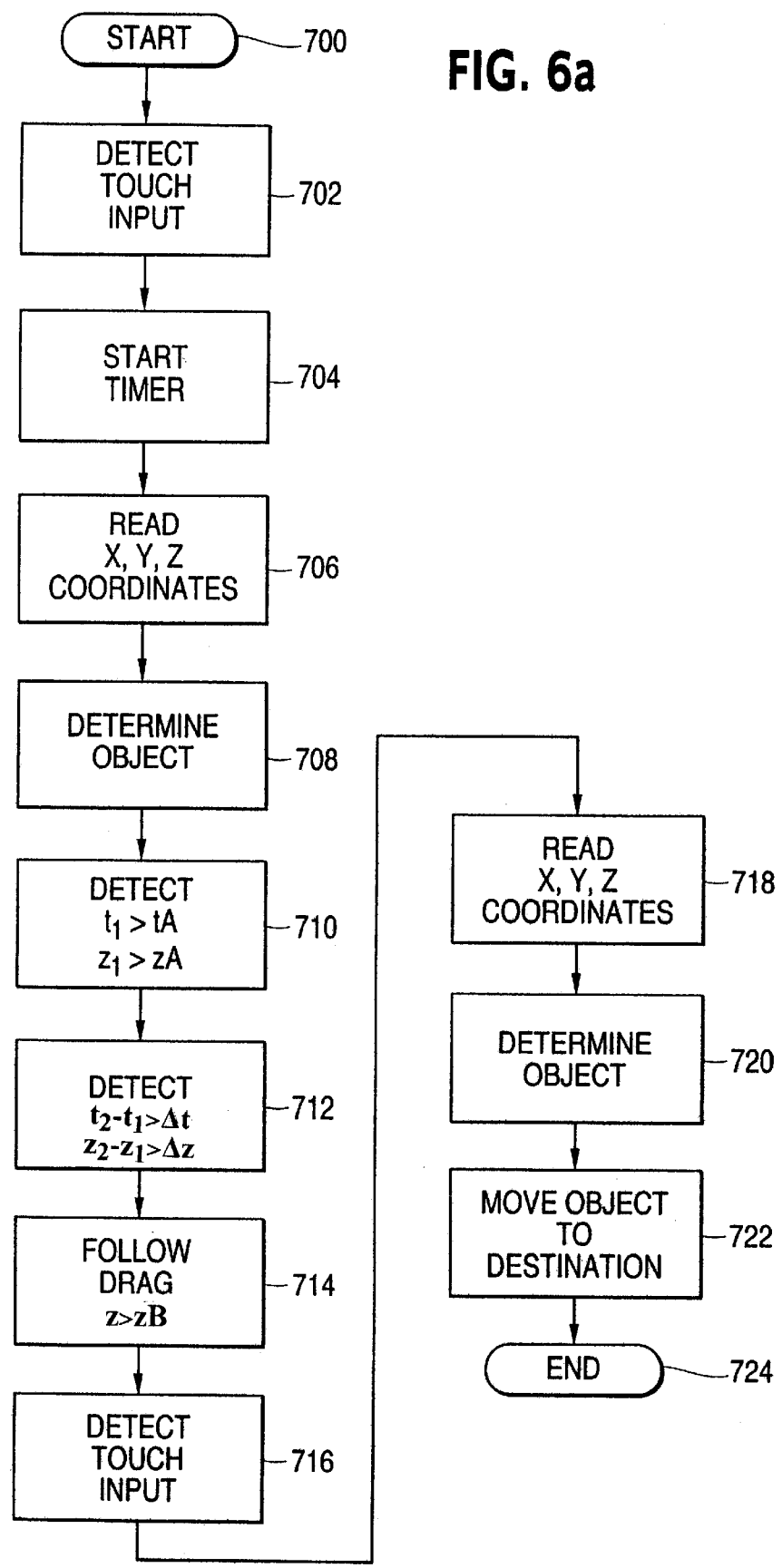
FIGS. 6a–6d are illustrations of a technique utilizing touch screen inputs for dragging and dropping objects displayed on the touch screen according to an embodiment of the present invention.
Figure 6B:
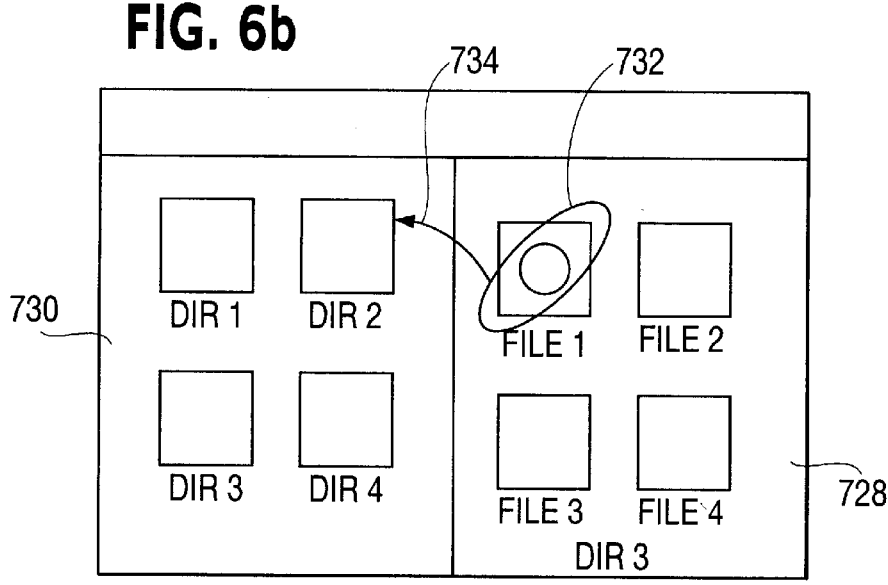
Figure 6C:
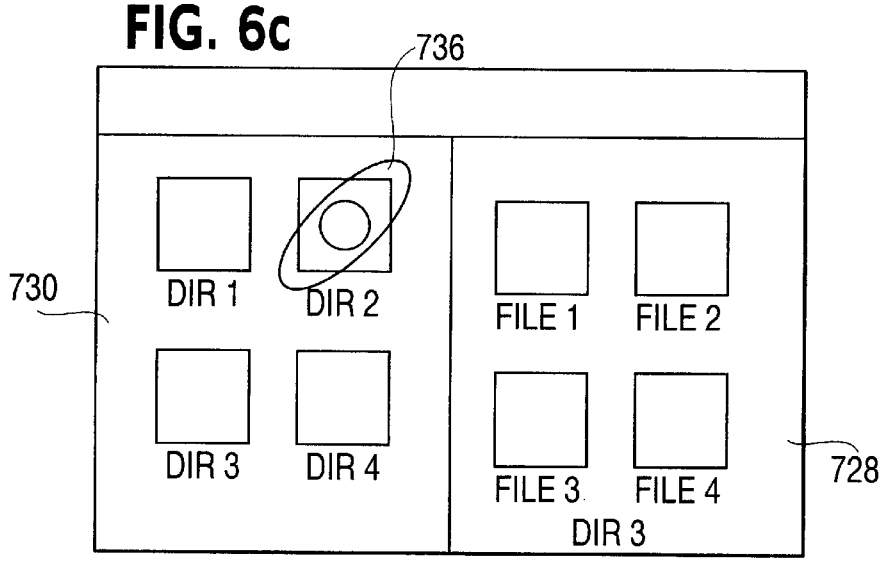
Figure 6D:
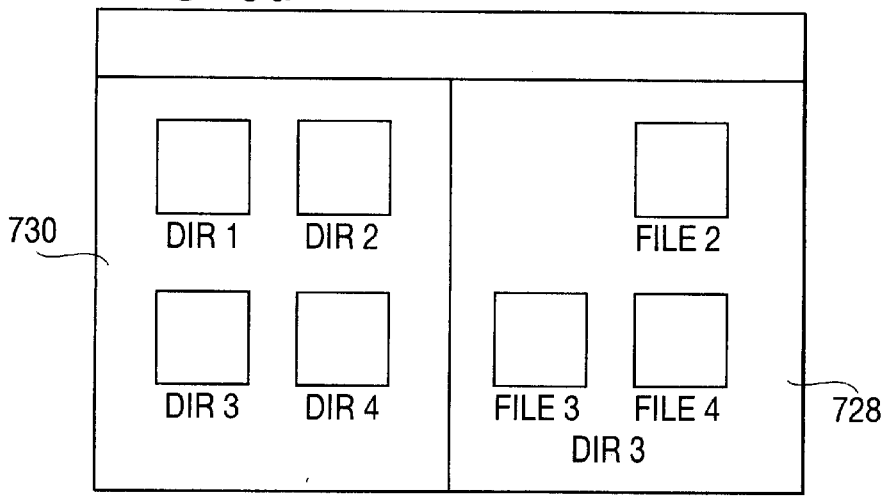

FIGS. 6a–6d illustrate a technique utilizing touch screen inputs for dragging and dropping objects displayed on the touch screen according to an example embodiment of the present invention. FIG. 6a illustrates the process steps while the remaining FIGS. 6b–6d illustrate the appearance of the touch screen 70 during the process.

As shown in the drawing figures, touch screen 70 is formatted to include windows 728 and 730 for displaying various outputs of the touch screen 70. Window 730 displays images of various user directories, for example, while window 728 displays images for each file in the directories, for example.

The process begins at step 700. At step 702, a touch screen input is detected. That is, the touch of an object, such as a finger or pointed stylus, on the touch screen 70 is detected. This is illustrated in FIG. 6b by touch input 732 being disposed over the object file 1 of window 728.

At step 704, a timer is started upon the detection of the object pressing the touch screen 70, and at step 706, the x and y coordinates of the touch input 732 are read. That is, the location of the object at its contact point with the touch screen 70 is determined.

At step 708, a determination is made that file 1 is the object, that is, the selected item, of touch input 732, and at step 710, a determination is made that the value of the pressure z of touch input 732 is greater than a predetermined value Za over the period of time $t_1$ that the object touches the touch screen 70, that is greater than a predetermined time tA. That is, the pressure of the object touching the touch screen 70 is determined to be greater than a predetermined pressure value for a period of time, which is greater than a predetermined period of time.

At step 712, a determination is made that the value of the pressure z of the object on the touch screen 70 has been reduced by an amount greater than a predetermined pressure differential $\Delta z$.

At step 714, the object is dragged across the face of the touch screen 70 at the reduced pressure z of the object on the touch screen 70. This is illustrated by drag path 734 in FIG. 6b. A determination that a drag operation is occurring may be discerned by detecting changes in the x and y coordinates over a predetermined period of time while allowing for discontinuities in the pressure of the object on the touch screen caused by momentary lifting of the object from the face of the touch screen 70 during the drag operation.

At step 716, a second touch input is detected by determining that the value of the pressure z of the object on the touch screen 70 is greater than a predetermined pressure value zB (which may be equal to zA) over a period of time $t_2$ of the object touching the touch screen 70 which is greater than a predetermined period of time tB. FIG. 6c illustrates the second touch input 736 being made over the image of directory 2 in window 730.

At step 718, the x and y coordinates of the second touch input 736 are determined, and at step 720, the object of the second touch, that is, the selected item of the second touch, is determined to be directory 2. At step 722, the object of the first touch input, that is, file 1, is then moved to the object of the second touch input, that is, directory 2. The process is then ended at step 724. FIG. 6d illustrates that file 1 has been moved from directory 3.

One skilled in the art will realize that many other variations are possible. For example, a drag function may be implemented by means of a long click to choose a first item which is to be moved and a subsequent short click to select a second item which is to be the repository of the first item, the "long click" corresponding to the object pressing on the touch screen 70 for a first predetermined period of time while the "short click" corresponding to the object pressing on the touch screen for a second predetermined period of time which is less than the first predetermined period of time.

This concludes the description of the example embodiments. Although the present invention has been described with reference to an illustrative embodiment thereof, it should be understood that numerous modifications and other embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of dragging and dropping an item displayed on a touch screen, the method comprising:

detecting a first location of an object touching a display of the item on the touch screen;

detecting that a pressure between the object and the touch screen at the first location is greater than a first predetermined pressure for a first predetermined period of time;

detecting a decrease in the pressure between the object and the touch screen at the first location of a predetermined amount from the first predetermined pressure to a reduced pressure;

detecting movement of the object across the touch screen at the reduced pressure from the first location to a second location;

detecting that the pressure between the object and the touch screen at the second location is greater than a second predetermined pressure for a time duration greater than a second predetermined period of time; and moving the display of the item from the first location on the touch screen to the second location on the touch screen.

2. The method of claim 1, wherein detecting the location of the object on the touch screen comprises detecting x and y coordinates of a point of contact of the object on the touch screen.

3. The method of claim 2, wherein the x and y coordinates correspond to a particular file location.

4. The method of claim 1, wherein detecting movement of the object comprises detecting that the location of the pressure between the object and the touch screen is changing at a rate greater than a predetermined rate.

5. The method of claim 1, wherein detecting the object touching the touch screen comprises detecting one of a finger, a stylus or a pointed object touching the touch screen.

6. An apparatus for dragging and dropping an item displayed on a touch screen, the apparatus comprising:

a location detector for detecting a location of an object touching the touch screen;

a pressure detector for detecting a pressure between the object and the touch screen; and a time duration measuring unit for measuring a time duration of the detection of the pressure between the object and the touch screen being greater than a first predetermined pressure or greater than a second predetermined pressure; and wherein in response to the location detector detecting a first location on the touch screen when the pressure between the object and the touch screen at the first location exceeds a first predetermined pressure for a time duration greater than a first predetermined time, detecting movement of the object across the touch screen at a reduced pressure less than the first predetermined pressure by a predetermined amount, and detecting a second location on the touch screen when the pressure between the object and the touch screen at the second location exceeds a second predetermined pressure for a time duration greater than a second predetermined time period, an item displayed at the first location on the touch screen is dragged and dropped on the second location on the touch screen.

7. The apparatus of claim 6, wherein the location detector detects the location of the object on the touch screen by detecting x and y coordinates of a point of contact of the object on the touch screen.

8. The apparatus of claim 7, wherein the x and y coordinates of the first location correspond to a particular file location.

9. The apparatus of claim 6 wherein the object comprises one of a finger, a stylus or a pointed object.

10. The apparatus of claim 6, wherein the location detector detects movement of the object by detecting that the location of the pressure between the object and the touch screen is changing at a rate greater than a predetermined rate.

11. The apparatus from claim 6, wherein the touch screen is included in a wireless terminal to receive configuration information from a server.

12. The apparatus of claim 11, wherein the server receives terminal configuration information from a configuration tool manager of a management server.

13. The apparatus of claim 11, wherein the server receives at least one of configuration and software product from a configuration tool manager of a management server, the configuration and software product being used in processing user selection information in the server.

14. A method of dragging and dropping an item displayed on a touch screen, the method comprising:

detecting a first location of an object touching a display of the item on the touch screen;

detecting that a pressure between the object and the touch screen at the first location is greater than a predetermined pressure for a time duration greater than a first predetermined period of time;

detecting that a pressure between the object and the touch screen at a second location on the touch screen is greater than the predetermined pressure for a time duration greater than a second predetermined time period, the second predetermined time period being smaller than the first predetermined time period; and moving the display of the item from the first location on the touch screen to the second location on the touch screen.

15. The method of claim 14, wherein detecting the location of the object on the touch screen comprises detecting x and y coordinates of a point of contact of the object on the touch screen.

16. The method of claim 15, wherein the x and y coordinates correspond to a particular file location.

17. The method of claim 14, wherein detecting the object touching the touch screen comprises detecting one of a finger, a stylus or a pointed object touching the touch screen.

18. An apparatus for dragging and dropping an item displayed on a touch screen, the apparatus comprising:

a location detector for detecting a location of an object on the touch screen;

a pressure detector for detecting a pressure between the object and the touch screen; and a time duration measuring unit for measuring a time duration of the detection of the pressure between the object and the touch screen being greater than a predetermined pressure;

wherein in response to the location detector detecting a first location on the touch when the pressure detector detects that the pressure between the object and the first location is greater than a predetermined pressure for a time duration greater than a first predetermined time period and detecting a second location on the touch screen when the pressure detector detects that the pressure between the object and the second location is greater than the predetermined pressure for a time duration greater than a second predetermined time period, the second predetermined time period being smaller than the first predetermined time period, an item disposed at the detected first location on the touch screen is dragged and dropped at the detected second location on the touch screen.

19. The apparatus of claim 18, wherein the location detector detects the location of the object on the touch screen by detecting x and y coordinates of a point of contact of the object on the touch screen.

20. The apparatus of claim 19, wherein the x and y coordinates correspond to a particular file location.

21. The apparatus of claim 18, wherein the object comprises one of a finger, a stylus, or a pointed object.

22. The apparatus of claim 18, wherein the touch screen is included in a wireless terminal to receive configuration information from a server.

23. The apparatus of claim 22, wherein the server receives terminal configuration information from a configuration tool manager of a management server.

24. The apparatus of claim 22, wherein the server receives at least one of configuration and software product from a configuration tool manager of a management server, the configuration and software product being used in processing user selection information in the server.

* * * * *